(12) United States Patent
Matsumura et al.

(10) Patent No.: US 12,334,580 B2
(45) Date of Patent: Jun. 17, 2025

(54) WIRING MODULE, POWER STORAGE MODULE, BUS BAR, AND MANUFACTURING METHOD FOR POWER STORAGE MODULE

(71) Applicants: AUTONETWORKS TECHNOLOGIES, LTD., Mie (JP); SUMITOMO ELECTRIC INDUSTRIES, LTD., Osaka (JP); SUMITOMO WIRING SYSTEMS, LTD., Osaka (JP)

(72) Inventors: Nobuyuki Matsumura, Mie (JP); Masakuni Kasugai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 611 days.

(21) Appl. No.: 17/623,475

(22) PCT Filed: Jun. 25, 2020

(86) PCT No.: PCT/JP2020/024996
§ 371 (c)(1),
(2) Date: Dec. 28, 2021

(87) PCT Pub. No.: WO2021/006052
PCT Pub. Date: Jan. 14, 2021

(65) Prior Publication Data
US 2022/0344766 A1    Oct. 27, 2022

(30) Foreign Application Priority Data

Jul. 11, 2019 (JP) .................... 2019-129605

(51) Int. Cl.
*H01M 50/298* (2021.01)
*H01M 50/249* (2021.01)
(Continued)

(52) U.S. Cl.
CPC ....... *H01M 50/298* (2021.01); *H01M 50/249* (2021.01); *H01M 50/507* (2021.01)

(58) Field of Classification Search
CPC ............ H01M 50/507; H01M 50/249; H01M 50/298; H01M 50/20
See application file for complete search history.

(56) References Cited

U.S. PATENT DOCUMENTS

| 6,168,470 B1 | 1/2001 | Ikeda et al. |
| 6,240,637 B1 | 6/2001 | Ikeda et al. |
| 2020/0172027 A1 | 6/2020 | Mizuno et al. |

FOREIGN PATENT DOCUMENTS

| JP | 11-120986 | 4/1999 |
| JP | 2015-049932 | 3/2015 |

(Continued)

OTHER PUBLICATIONS

Machine Translation of: JP 2015/049932A, Sugimoto et al., Mar. 16, 2015.*

(Continued)

*Primary Examiner* — Kenneth J Douyette
(74) *Attorney, Agent, or Firm* — Greenblum & Bernstein, P.L.C.

(57) ABSTRACT

A wiring module to be attached to a plurality of power storage elements each having an electrode terminal and arranged in an arrangement direction, the wiring module including: an insulative sheet; and a plurality of electric wires disposed along the arrangement direction, on a surface of the sheet. The electric wires are respectively electrically (Continued)

connected to bus bars that are connected to electrode terminals of the plurality of power storage elements.

15 Claims, 13 Drawing Sheets

(51) Int. Cl.
*H01M 50/50* (2021.01)
*H01M 50/507* (2021.01)

(56) References Cited

FOREIGN PATENT DOCUMENTS

| JP | 2015-118731 | 6/2015 |
| JP | 2016-115601 | 6/2016 |
| JP | 2019-003925 | 1/2019 |

OTHER PUBLICATIONS

International Search Report issued in International Bureau of WIPO Patent Application No. PCT/JP2020/024996, dated Sep. 24, 2020, along with an English translation thereof.

* cited by examiner

WIRING MODULE, POWER STORAGE MODULE, BUS BAR, AND MANUFACTURING METHOD FOR POWER STORAGE MODULE

TECHNICAL FIELD

The present disclosure relates to a wiring module, a power storage module, a bus bar, and a manufacturing method for a power storage module.

BACKGROUND ART

Conventionally, a battery module disclosed in Patent Document 1 (JP H11-120986A) is known as a battery module in which a battery wiring module is attached to a cell group in which cells each having electrode terminals are arranged side by side. This type of battery module is attached to a vehicle such as an electric automobile or a hybrid vehicle, and used as a motive power source of the vehicle.

The above battery wiring module is provided with a plurality of bus bars that connect electrode terminals to each other and a resin protector that holds the bus bars.

CITATION LIST

Patent Documents

Patent Document 1: JP H11-120986A

SUMMARY OF INVENTION

Technical Problem

With the above technology, a mold for injection-molding the resin protector using a synthetic resin is required, and thus an increase in the manufacturing cost of the wiring module is of concern.

The present disclosure has been made in light of the foregoing circumstances and is directed at providing technology regarding a wiring module with a reduced manufacturing cost.

Solution to Problem

The present disclosure is a wiring module to be attached to a plurality of power storage elements that each include an electrode terminal and are arranged side by side in an arrangement direction, the wiring module including: an insulative sheet; and a plurality of electric wires disposed along the arrangement direction, on a surface of the sheet, wherein the electric wires are configured to be respectively electrically connected to bus bars that are connected to electrode terminals of the plurality of power storage elements.

Advantageous Effects of Invention

With the present disclosure, the manufacturing cost of a wiring module can be reduced.

DESCRIPTION OF EMBODIMENTS

Figure 1:
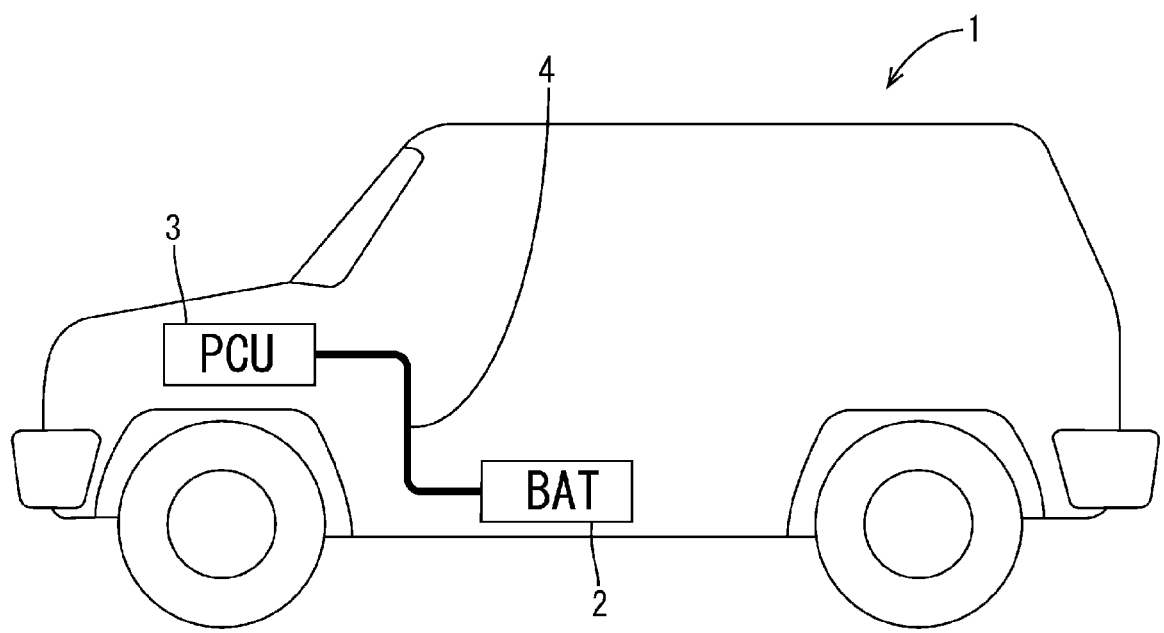
FIG. 1 is a schematic diagram showing a vehicle in which a power storage module according to Embodiment 1 is installed.

Description of Embodiments of the Present Disclosure

First, embodiments of the present disclosure will be listed and described.

(1) The present disclosure is a wiring module to be attached to a plurality of power storage elements that each include an electrode terminal and are arranged side by side in an arrangement direction, the wiring module including: an insulative sheet; and a plurality of electric wires disposed along the arrangement direction, on a surface of the sheet, wherein the electric wires are configured to be respectively electrically connected to bus bars that are connected to electrode terminals of the plurality of power storage elements.

There is no need to form an insulative protector through injection molding using an insulating synthetic resin, and thus no cost for manufacturing a mold is incurred. Accordingly, the manufacturing cost of the wiring module can be reduced.

The plurality of electric wires are disposed on the surface of the sheet, and thus the height of the wiring module can be reduced.

(2) It is preferable that each of the electric wires includes a trunk line portion extending along the arrangement direction, and a branch line portion extending from the trunk line portion in an intersecting direction that intersects with the arrangement direction, and end portions of the branch line portions are electrically connected to the bus bars.

It is sufficient that the leading ends of the branch line portions and the bus bars are connected to each other, and thus there is no need for an operation for routing an electric wire for each power storage element. Accordingly, the manufacturing efficiency of the wiring module can be improved.

(3) A configuration is also possible in which a terminal is connected to each of the electric wires, and the terminals are connected to the bus bars.

By employing the simple method of connecting the terminals and the bus bars to each other, the electric wires and the bus bars can be electrically connected with ease.

(4) It is preferable that the terminals each include a bus bar connection portion that extends in the arrangement direction and is connected to the bus bar.

The bus bar connection portions extend in the arrangement direction, and thus each bus bar connection portion can accommodate the tolerance of the power storage elements over the length of the bus bar connection portion in the arrangement direction.

(5) It is preferable that the terminals each include a wire connection portion that extends in the intersecting direction and is connected to the core wire.

By connecting the electric wires and the wire connection portions of the terminals, the bus bar connection portions can be disposed in an orientation extending along the arrangement direction. Accordingly, the position accuracy of the terminals can be easily improved.

(6) It is preferable that the sheet includes a base material and a welding layer, and the plurality of electric wires are fixed to the welding layer.

The strength of the sheet is maintained by the base member, while the electric wires can be easily welded thereto via the welding layer.

(7) A configuration is also possible in which the wiring module is a vehicle wiring module is a vehicle wiring module to be installed and used in a vehicle.

(8) The present disclosure is a power storage module including: the wiring module according to any one of (1) to (7) above; a plurality of power storage elements that each include an electrode terminal and are arranged along an arrangement direction; and a plurality of bus bars connected to the electrode terminals, wherein the plurality of bus bars each include a main body portion connected to the electrode terminals, and a protruding piece that protrudes from the main body portion and extends in the arrangement direction, and the protruding pieces and electric wires are electrically connected to each other.

The bus bars and the core wires of the electric wires are electrically connected to each other in the range of the arrangement direction length of the protruding pieces that extend in the arrangement direction, and thus the tolerance of the power storage elements in the arrangement direction can be accommodated.

(9) A configuration is also possible in which a terminal is connected to an end portion of each of the electric wires, and the terminals each include a bus bar connection portion that extends in the arrangement direction and is connected to the bus bar, and the protruding pieces and the bus bar connection portions are connected to each other.

In the range of connection between the protruding pieces extending in the arrangement direction and the bus bar connection portions extending in the arrangement direction, the bus bar connection portions can accommodate the tolerance of the power storage elements in the arrangement direction.

(10) It is preferable that the bus bars are made of the same type of metal as the main body portions, and the metal forming the protruding pieces and the metal included in the electric wires are the same type of metal.

Accordingly, the main body portions of the bus bars and the electrode terminals can be easily welded to each other, and the protruding pieces of the bus bars and the electric wires can be easily electrically connected to each other.

(11) It is preferable that the sheet is fixed to the power storage elements via a fixing portion.

The sheet and the power storage elements are fixed to each other by the fixing portion, and thus the position accuracy between the power storage elements and the wiring module can be improved.

(12) A bus bar according to the present disclosure is to be attached to electrode terminals of a plurality of power storage elements that are arranged side by side along an arrangement direction, and the bus bar preferably includes: a main body portion configured to connect adjacent electrode terminals; and a protruding piece that protrudes outward from the main body portion and is configured to be electrically connected to an electric wire.

An electric wire and the bus bar are electrically connected to each other at the protruding piece which is different from the main body portion that connects electrode terminals to each other. Accordingly, the voltages of the power storage elements can be detected in a state where the influence of a current flowing through the main body portion is mitigated.

(13) It is preferable that the main body portion includes a deforming portion that is bent in a direction orthogonal to a plate face of the main body portion, at an intermediate position of the main body portion in the arrangement direction, and the deforming portion is formed so as to be expandable and contractable in the arrangement direction.

As a result of the deforming portion expanding and contracting in the arrangement direction, the deforming portion can accommodate the tolerance of the power storage elements in the arrangement direction.

(14) The present disclosure is a method for manufacturing a power storage module, including: a step of connecting main body portions of bus bars to electrode terminals of a plurality of power storage elements arranged side by side in an arrangement direction; a step of connecting wire connection portions of terminals to end portions of electric wires; a step of arranging and fixing the plurality of electric wires to an insulative sheet so that bus bar connection portions provided in the terminals face in the same direction; a step of placing the sheet onto the plurality of power storage elements so that the bus bar connection portions face in the arrangement direction, and placing the bus bar connection portions on protruding pieces of the bus bars, the protruding pieces extending in the arrangement direction; and a step of connecting the protruding pieces to the bus bar connection portions.

With the above manufacturing method, the manufacturing process of the power storage module can be divided, and thus the manufacturing efficiency of the power storage module can be improved.

DETAILS OF EMBODIMENTS OF THE PRESENT DISCLOSURE

Embodiments of the present disclosure will be described below. The present invention is not limited to these examples and is defined by the scope of the claims, and all modifications that are equivalent to or within the scope of the claims are included.

Embodiment 1

Embodiment 1 in which a power storage pack 2 to which the present disclosure is applied is installed in a vehicle 1 will be described with reference to FIGS. 1 to 11. The power storage pack 2 is installed in the vehicle 1, which is an electric vehicle, a hybrid vehicle, or the like, and used as the motive power source of the vehicle 1. Hereinafter, when there are a plurality of members that are the same, a reference sign may only be given to some of the members and not given to other members.

Overall Configuration

As illustrated in FIG. 1, the power storage pack 2 is arranged in the central region of the vehicle 1. A power control unit (PCU) 3 is arranged in the front portion of the vehicle 1. The power storage pack 2 and the PCU 3 are connected by a wire harness 4. The power storage pack 2 and the wire harness 4 are connected by a connector (not shown). The power storage pack 2 includes a power storage module 10 that is provided with a plurality of power storage elements 11.

Figure 2:
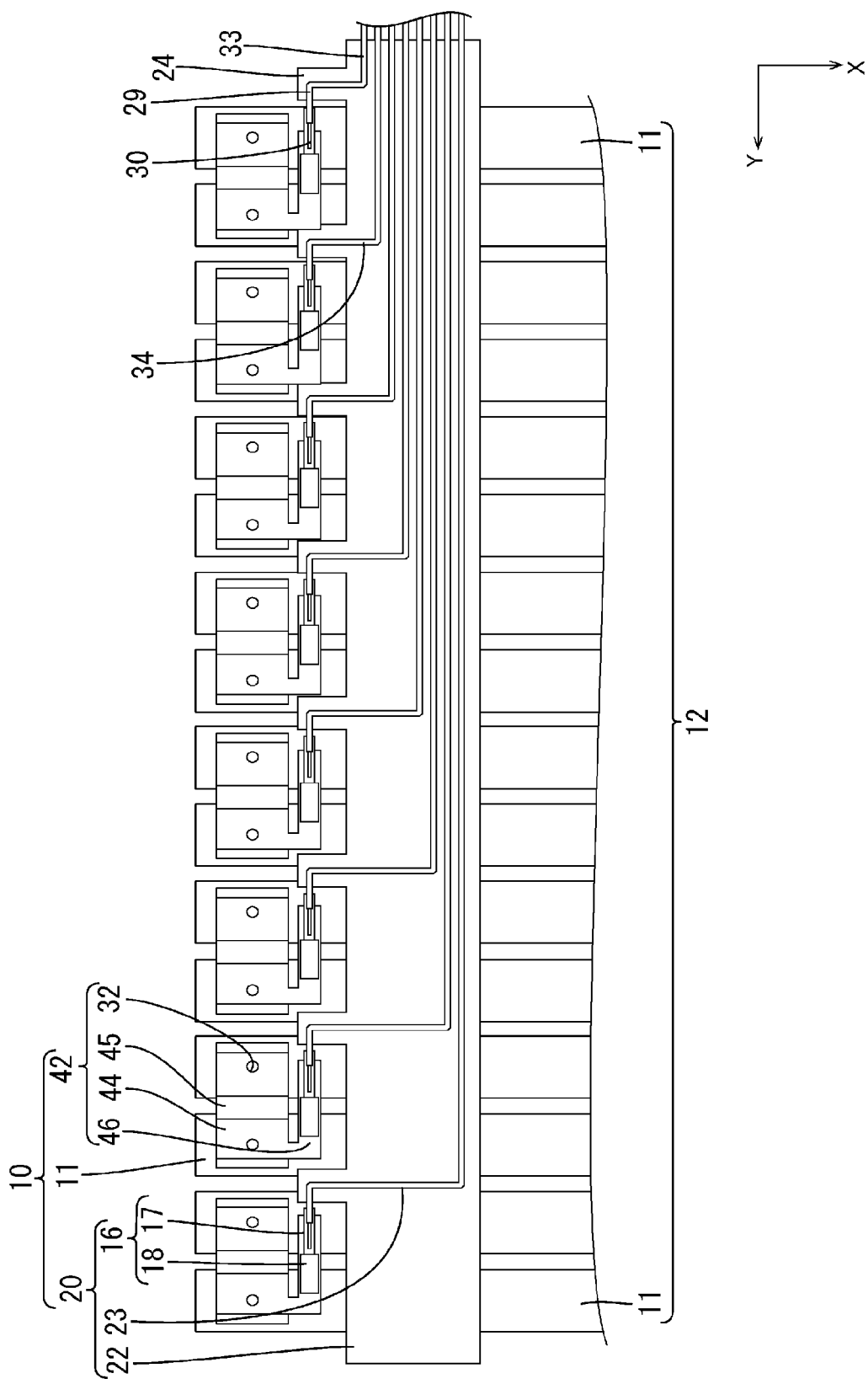
FIG. 2 is a partial enlarged plan view showing the power storage module according to Embodiment 1.

As shown in FIG. 2, the power storage module 10 is provided with a plurality of power storage elements 11 that each have electrode terminals 13, a bus bar 42 connected to electrode terminals 13, and a wiring module 20 that is attached to the power storage elements 11. In the following description, the direction indicated by the Z arrow is referred to as the upward direction, the direction indicated by the Y arrow is referred to as the forward direction, and the direction indicated by the X arrow is referred to as the leftward direction. Also, when there are a plurality of members that are the same, a reference sign may only be given to some of the members and not given to other members.

Power Storage Element 11

Figure 3:
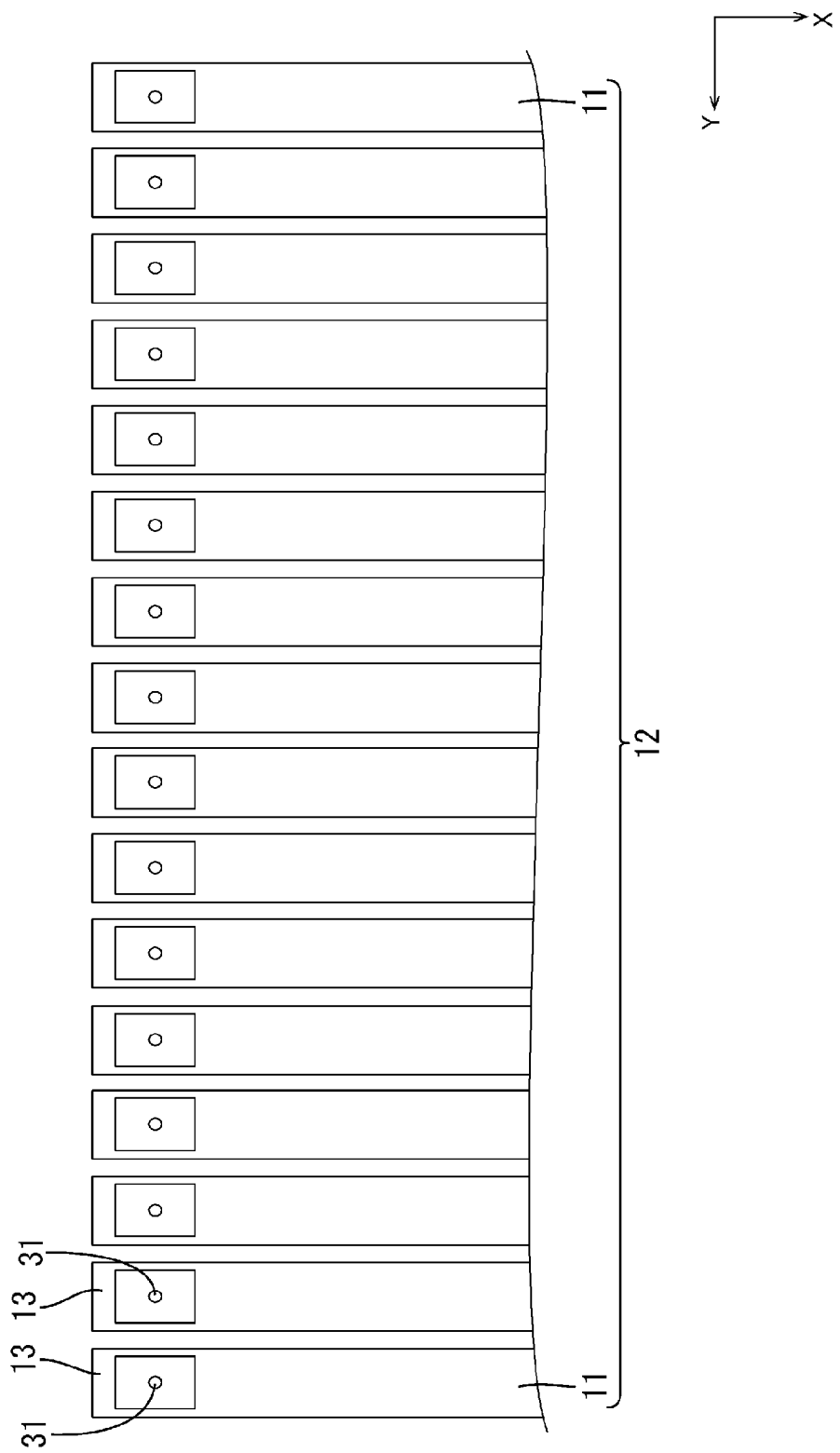
FIG. 3 is a partial enlarged plan view showing a power storage element group.

As shown in FIG. 3, the power storage elements 11 are each shaped like a flat rectangular parallelepiped that extends in the front-rear direction. An upward-protruding electrode terminal 13 is provided at the left end portion and the right end portion of the upper surface of each power storage element 11. One of the two electrode terminals 13 provided on a single power storage element 11 is the positive electrode and the other is the negative electrode. A power storage element group 12 is formed by arranging the plurality of power storage elements 11 side by side in the front-rear direction (an example of an arrangement direction).

Wiring Module 20

As shown in FIG. 2, the wiring module 20 is disposed on the upper surface of the power storage element group 12. The wiring module 20 is provided with a sheet 22, a plurality of electric wires 23 arranged on the upper surface of the sheet 22, and terminals 16 respectively connected to end portions of the electric wires 23.

Sheet 22

Figure 4:
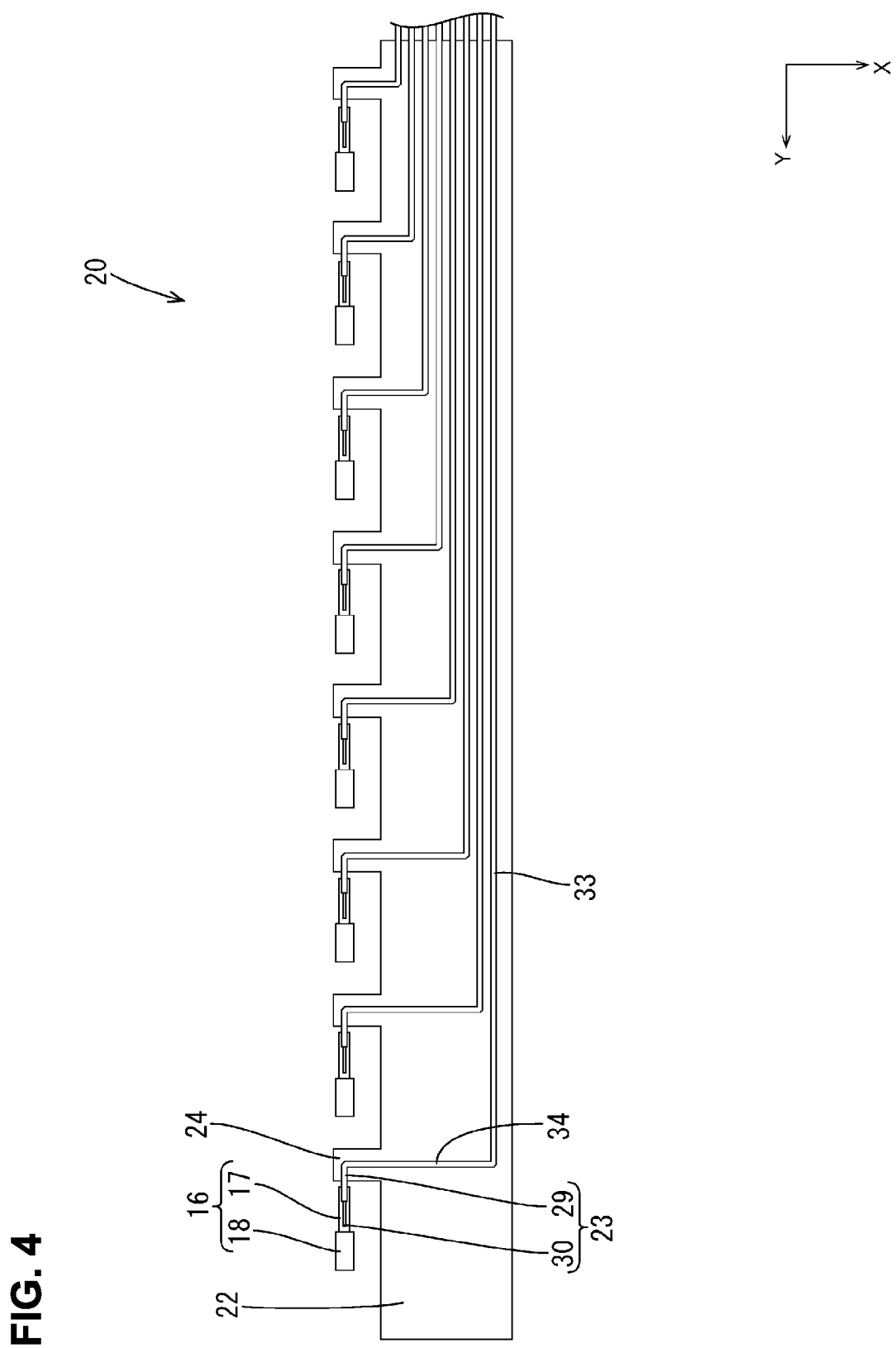
FIG. 4 is a plan view showing a wiring module.

As shown in FIG. 4, the sheet 22 is formed in a substantially rectangular shape that is elongated in the front-rear direction. On the right edge of the sheet 22, a plurality of extension pieces 24 that extend rightward are provided spaced apart from each other in the front-rear direction.

Figure 5:
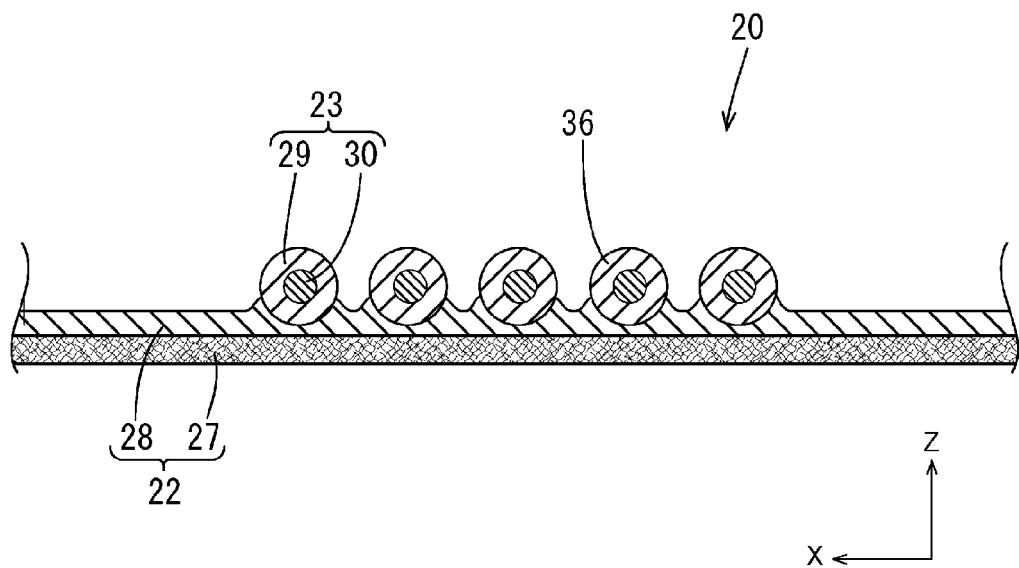
FIG. 5 is a cross-sectional view showing a fixing structure between an electric wire and a sheet.

As shown in FIG. 5, the sheet 22 has a base material 27 and a welding layer 28 layered onto the upper surface of the base material 27. The base material 27 is made of a non-woven fabric. The non-woven fabric may take the form of a fiber sheet, a web (a thin, film-like sheet made entirely of fibers), or batting (fibers in the form of a blanket). Natural fibers, synthetic fibers made from a synthetic resin, or both natural fibers and synthetic fibers can be used as the material constituting the non-woven fabric. Any synthetic fibers made of a polyolefin such as polypropylene or polyethylene, a polyester such as polybutylene terephthalate or polyethylene terephthalate, or the like can be selected as appropriate as the synthetic fibers.

The synthetic resin constituting the welding layer 28 is not particularly limited, and any synthetic resin such as PVC or polyethylene can be selected as appropriate. A synthetic resin that can be welded to a later-described insulating coating 29 of the electric wires 23 is preferable as the synthetic resin constituting the welding layer 28. In the present embodiment, PVC is used.

Electric Wires 23

As shown in FIG. 4, each electric wire 23 includes a core wire 30 and an insulating coating 29 that surrounds the core wire 30. The configuration of the core wire 30 is not particularly limited, and may be a stranded wire in which a plurality of thin metal wires are twisted together, or a so-called single core wire formed of a single rod-shaped metal wire, for example. The core wires 30 of the present embodiment are stranded wires.

The insulating coating 29 is made of an insulative synthetic resin. The synthetic resin constituting the insulating coating 29 is not particularly limited, and any synthetic resin such as polyethylene or PVC can be selected as appropriate, for example. In the present embodiment, PVC is used. In the present embodiment, the welding layer 28 and the insulating coating 29 are constituted by the same synthetic resin material.

Bus Bar 42

Figure 6:
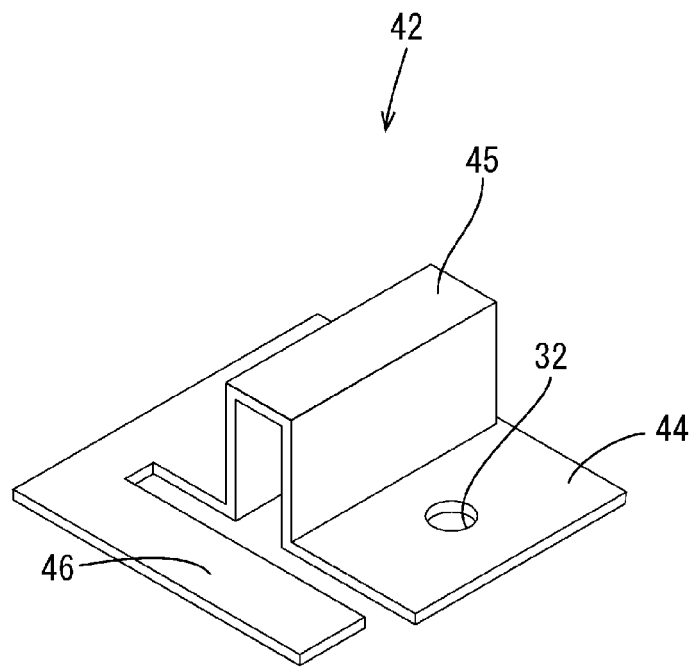
FIG. 6 is a perspective view showing a bus bar.

As shown in FIG. 6, a bus bar is formed by pressing a metal sheet material into a predetermined shape. Any metal such as copper, a copper alloy, aluminum, an aluminum alloy, or the like can be selected as appropriate as the metal constituting the bus bar 42.

Figure 7:
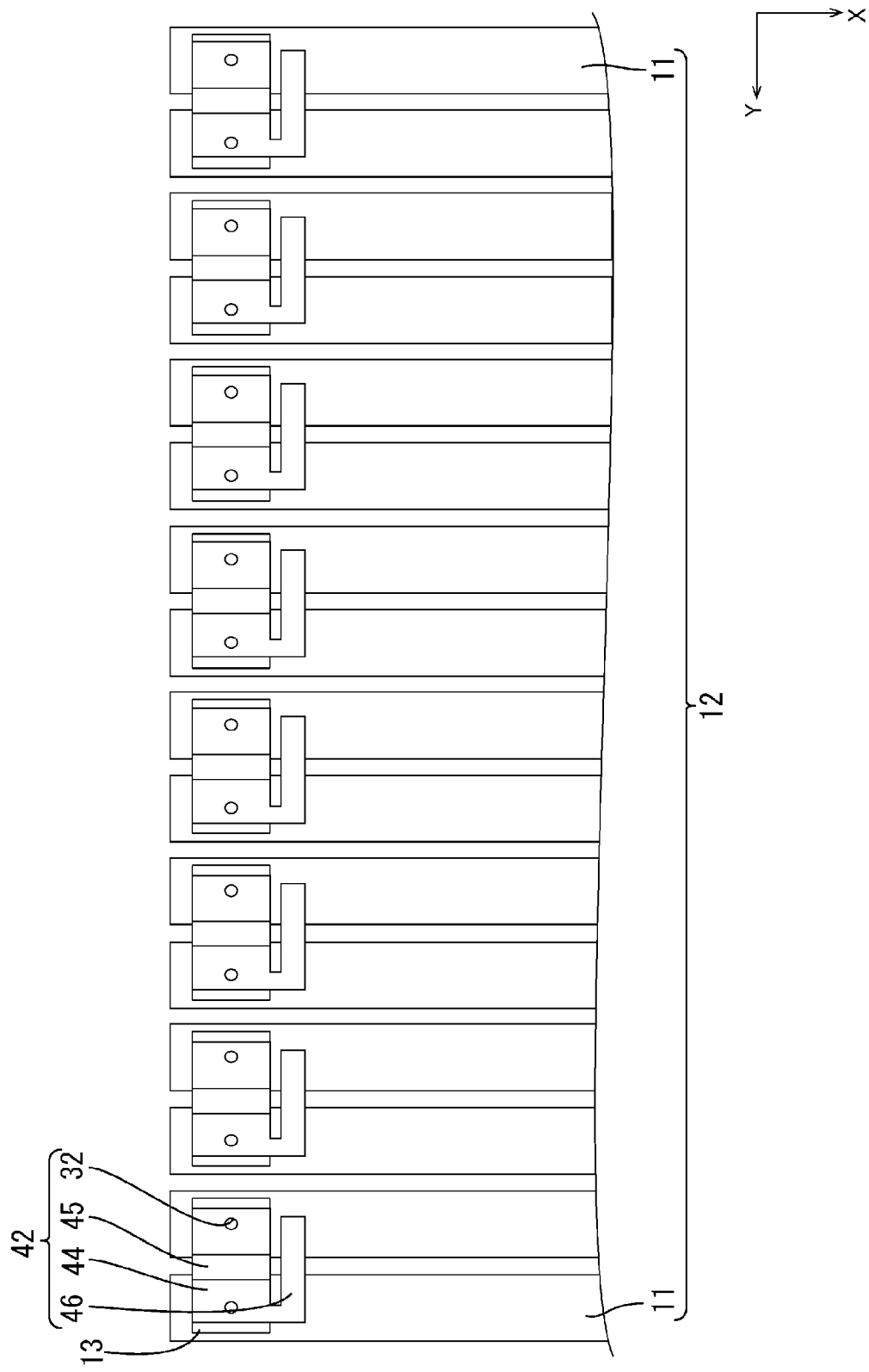
FIG. 7 is a partial enlarged plan view showing the bus bar connected to electrode terminals of power storage elements.

As shown in FIG. 7, the bus bar 42 has a main body portion 44 that has a substantially rectangular shape as seen from above, a deforming portion 45 that protrudes upward in the central region of the main body portion 44 in the front-rear direction thereof, and a protruding piece 46 that protrudes leftward from the front-left corner of the main body portion 44 and is bent to extend rearward.

Figure 8:
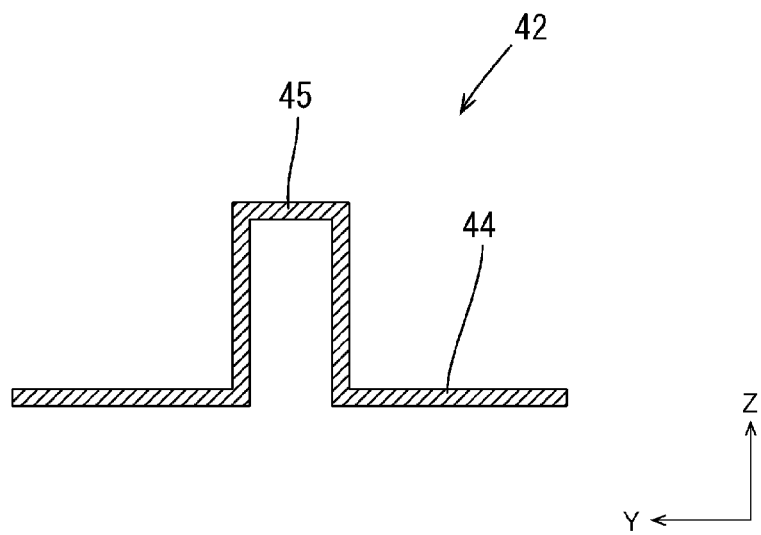
FIG. 8 is a cross-sectional view showing the bus bar.
Figure 9:
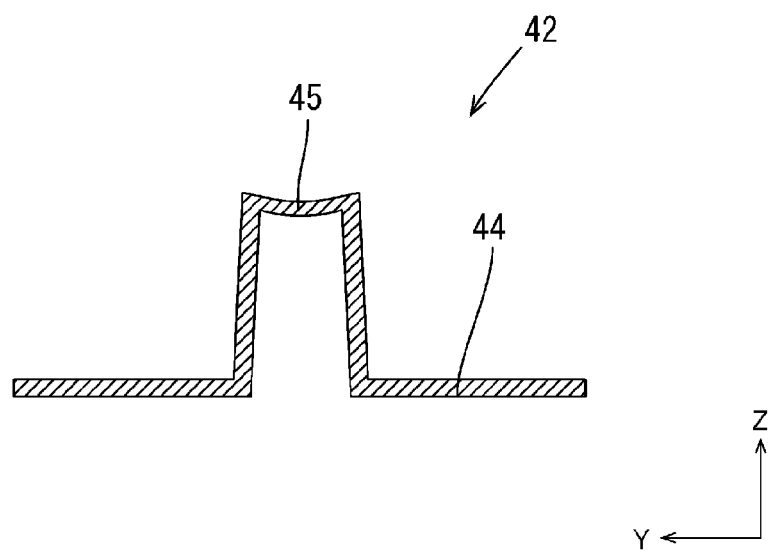
FIG. 9 is a cross-sectional view showing a state in which a deforming portion of the bus bar has been spread out in a front-rear direction.

The deforming portion 45 extends in the left-right direction. The deforming portion 45 extends from the left edge to the right edge of the bus bar 42. As shown in FIG. 8, the deforming portion 45 is open downward, and the cross-sectional shape of the deforming portion 45 is an approximate U-shape. As shown in FIG. 9, as a result of the deforming portion 45 deforming by spreading out in the front-rear direction, the bus bar 42 can deform to accommodate a tolerance in the front-rear direction of the power storage elements 11.

The protruding piece 46 has a rectangular shape that extends in the front-rear direction, as seen from above. The core wire 30 of the electric wire 23 is placed on the upper surface of the protruding piece 46, and the protruding piece 46 and the core wire 30 are connected. The protruding piece 46 and the core wire 30 are connected to each other by using a known method such as soldering, brazing, ultrasonic welding, resistance welding, or laser welding. If the protruding piece 46 and the core wire 30 are to be connected through laser welding, it is preferable that the core wire 30 is a single core wire.

The main body portion 44 of the bus bar 42 has a substantially rectangular shape that is elongated in the front-rear direction, as seen from above. The main body portion 44 of the bus bar 42 is connected to a pair of adjacent electrode terminals 13 of different power storage elements 11. The length of the main body portion 44 of the bus bar 42 in the front-rear direction is set to be long enough to cover the adjacent electrode terminals 13 from above. The main body portion 44 of the bus bar 42 and the electrode terminals 13 may be connected through laser welding, soldering, or the like, but the method is not particularly limited. In the present embodiment, the main body portion 44 of the bus bar 42 and the electrode terminals 13 are laser welded to each other.

As shown in FIG. 3, a positioning pin 31 that protrudes upward is provided on the upper surface of each electrode terminal 13. The positioning pins 31 have a circular columnar shape. As shown in FIG. 7, positioning holes 32 extend through the main body portion 44 of the bus bar 42 at positions that correspond to the positioning pins 31. By passing the positioning pins 31 through the positioning holes 32, the electrode terminals 13 and the bus bar 42 are positioned.

Terminal 16

Figure 10:
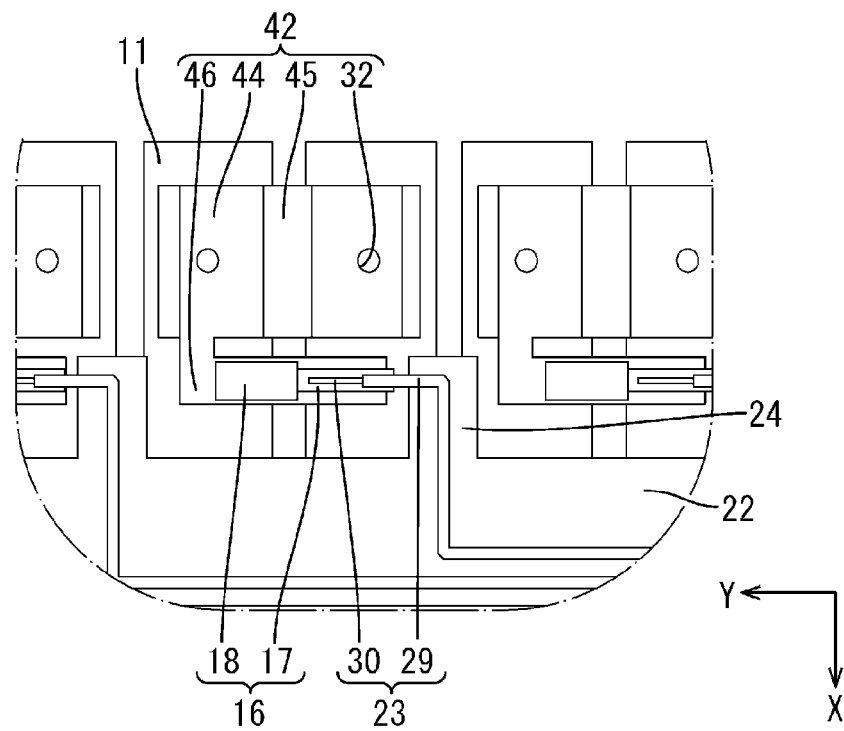
FIG. 10 is a partial enlarged plan view showing a connection structure between a protruding piece of the bus bar and a bus bar connection portion of a terminal.
Figure 11:
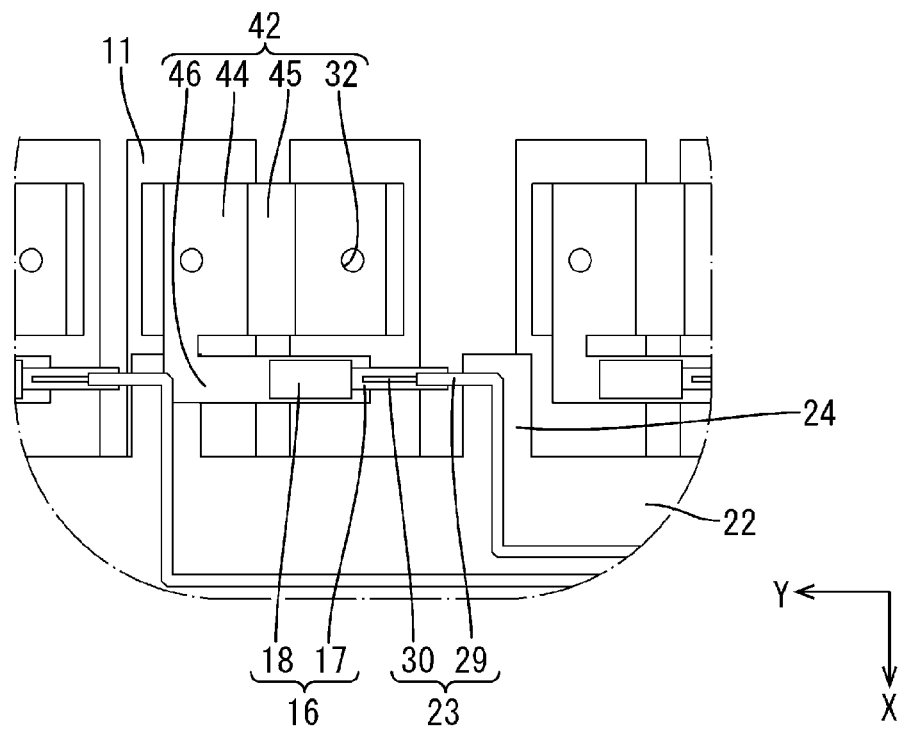
FIG. 11 is a partial enlarged plan view showing a connection structure between the protruding piece of the bus bar and the bus bar connection portion of the terminal.

As shown in FIGS. 10 and 11, the terminal 16 has a wire connection portion 17 to which the core wire 30 of the electric wire 23 is connected, and a bus bar connection portion 18 that is continuous with the wire connection portion 17 and is connected to the protruding piece 46 of the bus bar 42. One end portion of the core wire 30 of the electric wire 23 is connected to the wire connection portion 17, and the other end portion is connected to an ECU (Electronic Control Unit), which is not shown. Accordingly, the voltages of the power storage elements 11 are detected by the electric wire 23 via the bus bar 42 and the terminal 16.

In a state where the core wire 30 is placed on the upper surface of the wire connection portion 17, the wire connection portion 17 and the core wire are connected. The method for connecting the wire connection portion 17 and the core wire 30 is not particularly limited, and a known method such as brazing or soldering, welding (e.g., laser welding, ultrasonic welding, or resistance welding), crimping, or pressure fitting can be selected. In the present embodiment, the wire connection portion 17 and the core wire are welded together.

The bus bar connection portion 18 is disposed extending forward from the right end portion of an extension piece 24. Accordingly, the bus bar connection portion 18 is disposed in an orientation extending in the front-rear direction.

In a state where the bus bar connection portion 18 is placed on the upper surface of the protruding piece 46 of the bus bar 42, the protruding piece 46 and the bus bar connection portion 18 are connected to each other. The method for connecting the protruding piece 46 and the bus bar connection portion 18 is not particularly limited, and such connection is performed through brazing or soldering, or welding such as laser welding, ultrasonic welding, or resistance welding. In the present embodiment, the protruding piece 46 and the bus bar connection portion 18 are laser welded to each other.

The connection position where the protruding piece 46 that extends in the front-rear direction is connected to the bus bar connection portion 18 that extends in the front-rear direction can be selected from any position in the overlapping range of the protruding piece 46 and the bus bar connection portion 18 in the front-rear direction. Accordingly, tolerance in the front-rear direction of the power storage elements 11 can be accommodated (see FIGS. 10 and 11).

Fixing Structure between Sheet 22 and Electric Wires 23

As shown in FIG. 4, the electric wires 23 disposed on the upper surface of the sheet 22 each include a trunk line portion 33, which is a portion that is routed in the front-rear direction. Each electric wire 23 has a branch line portion 34 that is bent rightward from the trunk line portion 33. All electric wires 23 are arranged side-by-side in the left-right direction at the rear end portion of the sheet 22. As the electric wires 23 extend forward, branch wire portions 34 that are bent rightward are formed in order from the electric wire 23 on the right end of the electric wires 23 constituting the trunk line portions 33.

As shown in FIG. 5, the insulating coating 29 of the electric wire 23 constituting the trunk line portion 33 is thermally welded to the welding layer 28 formed on the upper surface of the sheet 22. The method with which the insulating coating 29 of the electric wire 23 is welded to the welding layer 28 of the sheet 22 is not particularly limited, and thermal welding such as ultrasonic welding or resistance welding, laser welding, or the like can be selected as appropriate.

Similarly to the electric wires 23 of the trunk line portions 33, the insulating coatings 29 of the electric wires 23 constituting the branch line portions 34 are thermally welded to the welding layer 28 formed on the upper surface of the sheet 22.

Each electric wire 23 constituting a branch line portion 34 is disposed on the upper surface of an extension piece 24 of the sheet 22, and is arranged bent forward from the right end portion of the extension piece 24. By stripping the insulating coating 29 from an end portion of the electric wire 23, the core wire 30 is exposed. As mentioned above, the exposed core wire 30 is connected to the wire connection portion 17 of the terminal 16.

Manufacturing Process of Present Embodiment

Next, an example of the process for manufacturing the power storage module 10 and the wiring module 20 according to the present embodiment will be described. The process for manufacturing the power storage module 10 and the wiring module 20 is not limited to the following.

The sheet 22 is formed by layering the welding layer 28 onto the base material 27. The sheet 22 is cut into a predetermined shape.

An end of each electric wire 23 is stripped to expose the core wire 30. The plurality of electric wires 23 are routed in a predetermined shape on the upper surface of the sheet 22. By thermally welding the insulating coating 29 of each electric wire 23 to the welding layer 28 of the sheet 22, the electric wires 23 and the sheet 22 are fixed to each other.

The core wires 30 of the electric wires 23 and the terminals 16 are connected to each other. Accordingly, a completed wiring module is obtained (see FIG. 4).

By arranging the plurality of power storage elements 11 side by side in the front-rear direction, the power storage element group 12 is formed (see FIG. 3). The main body portion 44 of the bus bar 42 is placed on the upper surface of the electrode terminals 13 of the power storage element group 12 (see FIG. 7). At this time, the positioning pins 31 are inserted into the positioning holes 32 of the bus bar 42. The bus bar 42 and the electrode terminals 13 are thus connected.

The wiring module 20 is disposed on the upper surface of the power storage element group 12. The bus bar connection portion 18 of the terminal 16 is placed on the upper surface of the protruding piece 46 of the bus bar 42. The protruding piece 46 and the bus bar connection portion 18 are welded to each other. Thus, the completed power storage module 10 is obtained.

Operation and Effects of Present Embodiment

Next, effects and the operation of the present embodiment will be described. The present embodiment is a wiring module 20 to be attached to a plurality of power storage elements 11 that each have an electrode terminal 13 and are arranged in an arrangement direction, the wiring module including: an insulative sheet 22; and a plurality of electric wires 23 disposed along the arrangement direction, on a surface of the sheet 22. Each electric wire 23 has a core wire 30 and an insulating coating 29 that surrounds the core wire 30, the insulating coating 29 being made of an insulative synthetic resin, and the core wire 30 is connected to a bus bar 42 that is connected to electrode terminals 13 of a plurality of power storage elements 11.

The plurality of electric wires 23 are disposed on the surface of the sheet 22, and thus the height of the wiring module 20 can be reduced.

There is no need to form an insulative protector through injection molding using an insulating synthetic resin, and thus no cost for manufacturing a mold is incurred. Accordingly, the manufacturing cost of the wiring module 20 can be reduced.

Also, in the present embodiment, each of the electric wires 23 includes a trunk line portion 33 extending along the arrangement direction, and a branch line portion 34 extending from the trunk line portion 33 in a left-right direction that intersects with a front-rear direction, and the core wire 30 exposed from an end portion of the branch line portion 34 is electrically connected to the bus bar 42.

It is sufficient that the core wire 30 exposed from the leading end of the branch line portion 34 and the bus bar 42 are connected to each other, and thus there is no need to perform an operation for routing an electric wire 23 for each power storage element 11. Accordingly, the manufacturing efficiency of the wiring module 20 can be improved.

Also, in the present embodiment, the terminal 16 has the bus bar connection portion 18 that extends in the front-rear direction and is connected to the bus bar 42.

With the present embodiment, the terminal 16 is connected to the core wire 30, and the terminal 16 is connected to the bus bar 42.

By employing the simple method of connecting the terminal 16 and the bus bar 42 to each other, the electric wire 23 and the bus bar 42 can be easily electrically connected to each other.

The bus bar connection portion 18 extends in the front-rear direction, which is the direction in which the power storage elements 11 are arranged, and thus, over the length of the bus bar connection portion 18 in the front-rear direction, the bus bar connection portion 18 can accommodate the tolerance of the power storage elements 11 in the front-rear direction in which the plurality of power storage elements 11 are arranged.

Also, with the present embodiment, the sheet 22 has the base material 27 and the welding layer 28, and the plurality of electric wires 23 are fixed to the welding layer 28.

The strength of the sheet 22 is maintained by the base member 27, while the electric wires 23 can be easily welded thereto via the welding layer 28.

The present embodiment is a power storage module 10 including: the above wiring module 20; a plurality of power storage elements 11 that each include an electrode terminal 13 and are arranged along a front-rear direction; and a plurality of bus bars 42 connected to the electrode terminals 13. The plurality of bus bars 42 each include a main body portion 44 connected to the electrode terminals 13, and a protruding piece 46 that protrudes from the main body portion 44 and extends in the arrangement direction, a terminal 16 has a bus bar connection portion 18 that extends in the front-rear direction and is connected to the bus bar 42, and the protruding piece 46 and the bus bar connection portion 18 are connected to each other.

In the range of connection between the protruding piece 46 extending in the front-rear direction and the bus bar connection portion 18 extending in the front-rear direction, the bus bar connection portion 18 can accommodate the tolerance of the power storage elements 11 in the front-rear direction.

In the present embodiment, the electric wire 23 and the bus bar 42 are electrically connected to each other at the protruding piece 46 which is different from the main body portion 44 that connects electrode terminals 13 to each other. Accordingly, the voltages of the power storage elements 11 can be detected in a state where the influence of a current flowing through the main body portion 44 is mitigated.

With the present embodiment, the main body portion 44 has a deforming portion 45 that is bent in a direction orthogonal (upward) to a plate face of the main body portion 44, at an intermediate position thereof in the front-rear direction, and the deforming portion 45 is formed so as to be expandable and contractable in the front-rear direction.

As a result of the deforming portion 45 expanding and contracting in the front-rear direction, the deforming portion 45 can accommodate the tolerance of the power storage elements 11 in the front-rear direction.

A process for manufacturing a power storage module 10 according to the present embodiment including: a step of connecting a main body portion 44 of a bus bar 42 to an electrode terminal 13 of a plurality of power storage elements 11 arranged side by side in a front-rear direction; a step of connecting end portions of electric wires 23 to wire connection portions 17 of terminals 16; a step of arranging and fixing the plurality of electric wires 23 to an insulative sheet 22 so that bus bar connection portions 18 provided in the terminals 16 face in the same direction; a step of placing the sheet 22 onto the plurality of power storage elements 11 so that the bus bar connection portions 18 face in the front-rear direction, and placing the bus bar connection portions 18 on protruding pieces 46 of the bus bars 42, the protruding pieces 46 extending in the front-rear direction; and a step of connecting the protruding pieces 46 to the bus bar connection portions 18.

With the present embodiment, a power storage element manufacturer connects the bus bars 42 to the electrode terminals 13 of the arranged power storage elements 11, an electric wire manufacturer assembles the wiring module 20, and a car manufacturer attaches the wiring module 20 to the plurality of power storage elements 11. Accordingly, the manufacturing process of the power storage module 10 can be divided, and thus the manufacturing efficiency of the power storage module 10 can be improved.

The wiring module 20 according to the present embodiment is a vehicle wiring module 20 for installation and use in the vehicle 1.

Embodiment 2

Figure 12:
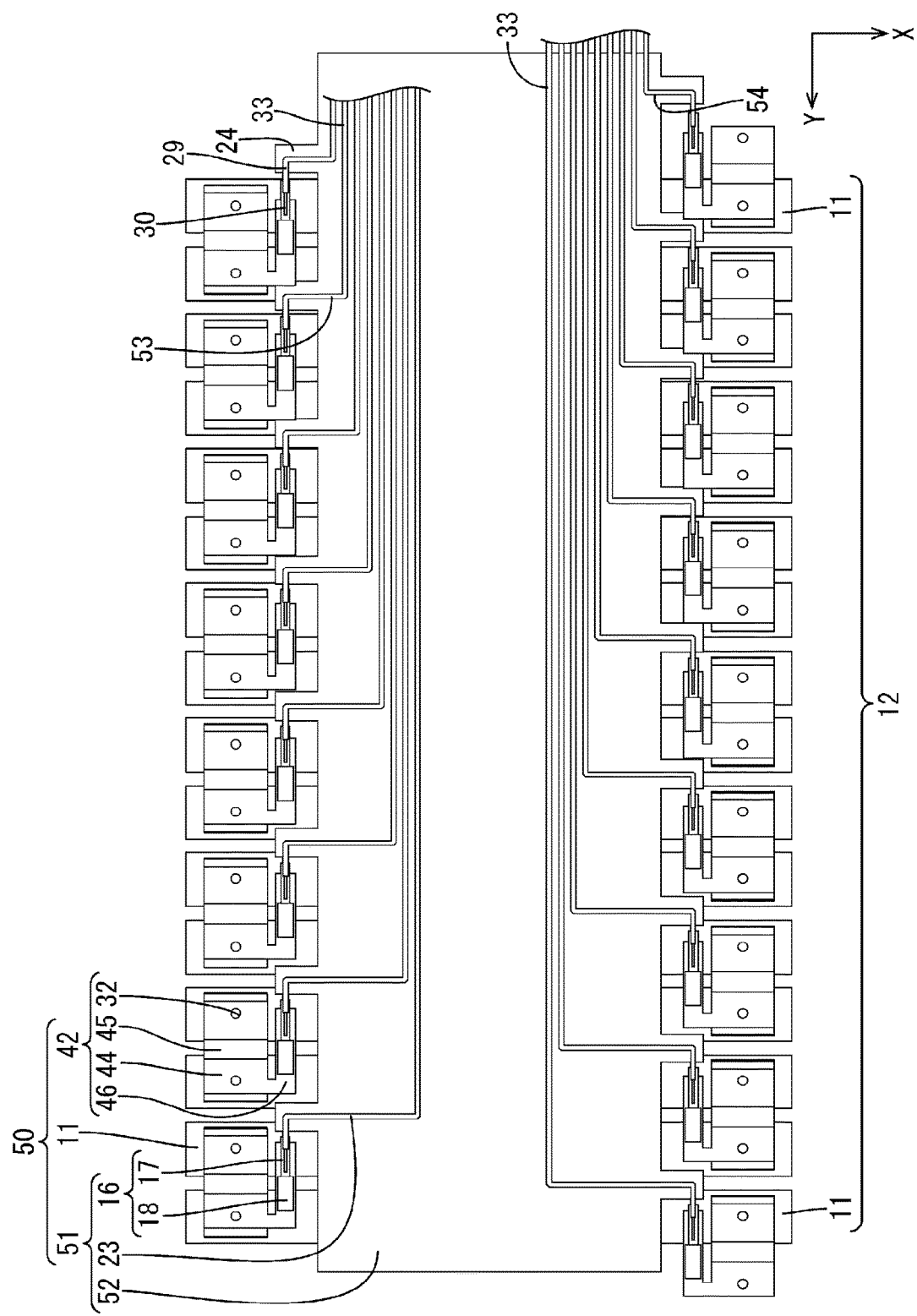
FIG. 12 is a plan view showing a power storage module according to Embodiment 2.

Next, Embodiment 2 of the present disclosure will be described with reference to FIG. 12. A wiring module 51 according to the present embodiment for attachment to a power storage module 50 has a right branch line portion 53 located toward the right end portion of a sheet 52, and a left branch line portion 54 located toward the left end portion of the sheet 52. An end portion of the electric wire 23 constituting the right branch line portion 53 is connected to a terminal 16, and an end portion of the electric wire 23 constituting the left branch line portion 54 is also connected to a terminal 16. Accordingly, by attaching one wiring module 51 to the power storage element group 12, the plurality of power storage elements 11 can be directly connected to the wiring module 51.

Components other than those described above are substantially similar to those of Embodiment 1, and thus similar members are given the same reference sign and redundant description will be omitted.

Embodiment 3

Figure 13:
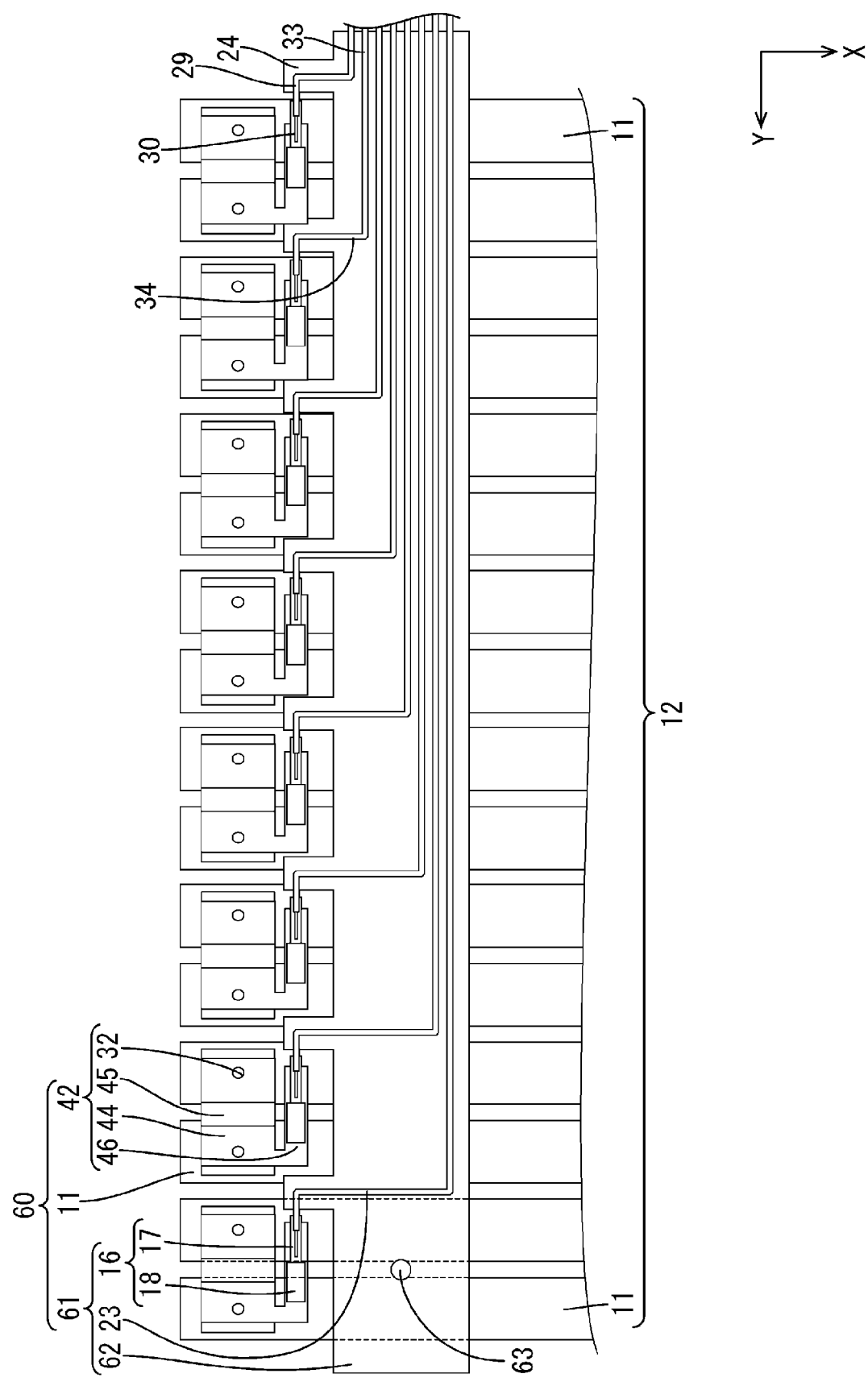
FIG. 13 is a partial enlarged plan view showing a power storage module according to Embodiment 3.

Next, Embodiment 3 of the present disclosure will be described with reference to FIG. 13. In a power storage module 60 according to the present embodiment, the power storage elements 11 and a sheet 62 of a wiring module 61 are fixed to each other by a pin 63 (an example of a fixing member). By fitting the pin 63, which pierces the sheet 62, between adjacent power storage elements 11, the pin 63 is fixed by the adjacent power storage elements 11. Note that, a configuration may be employed where the pin 63 is fitted into a frame-shaped member (not shown) partitioning adjacent power storage elements 11.

Accordingly, the position accuracy between the power storage elements 11 and the wiring module 61 can be improved.

Components other than those described above are substantially similar to those of Embodiment 1, and thus similar members are given the same reference sign and redundant description will be omitted.

Embodiment 4

Figure 14:
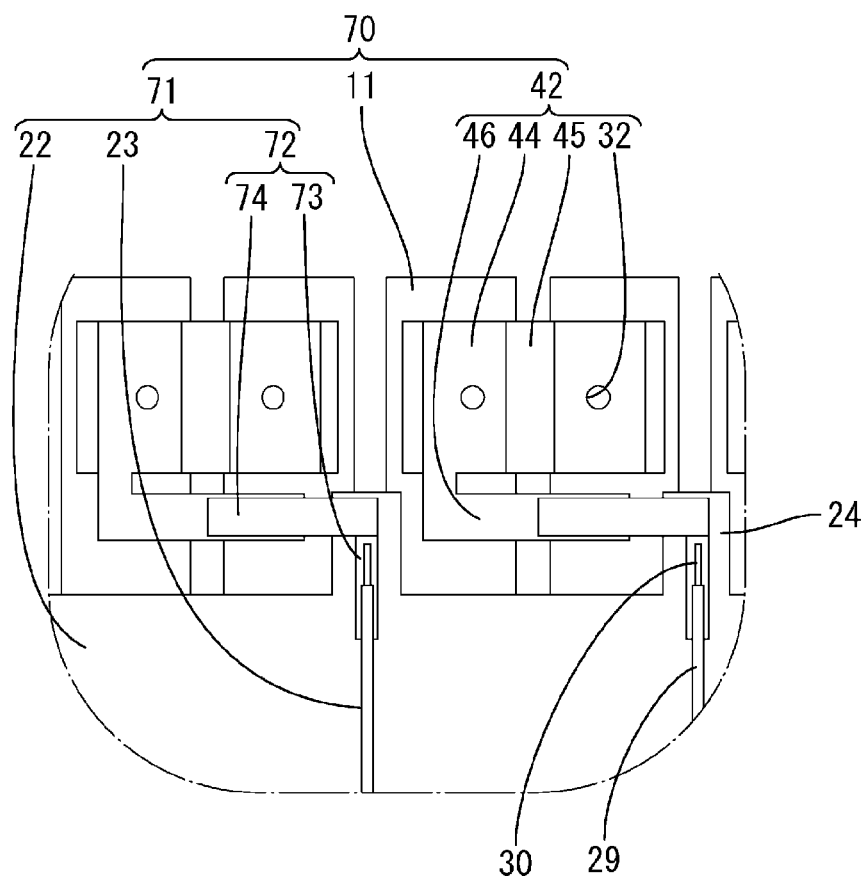
FIG. 14 is a partial enlarged plan view showing a power storage module according to Embodiment 4.

Next, Embodiment 4 of the present disclosure will be described with reference to FIG. 14. In a wiring module 71 of a power storage module 70 according to the present embodiment, a terminal 72 has a wire connection portion 73 that extends in the left-right direction and is connected to a core wire 30. The terminal 72 has a bus bar connection portion 74 that extends in the front-rear direction, and thus the terminal 72 is bent in an L-shape as seen from above.

By connecting the core wire 30 of the electric wire 23 and the wire connection portion 73 of the terminal 72, the bus bar connection portion 74 can be disposed in an orientation extending in the front-rear direction. Accordingly, the position accuracy of the terminal 72 can be easily improved.

Configurations other than those described above are similar to those of Embodiment 1, and thus similar members are given the same reference sign and redundant description will be omitted.

Embodiment 5

Figure 15:
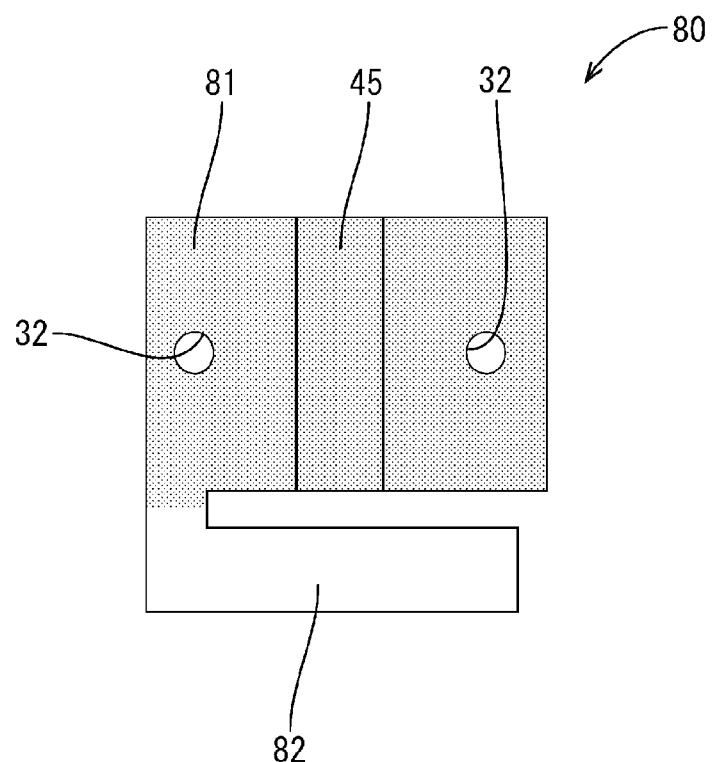
FIG. 15 is a plan view showing a bus bar according to Embodiment 5.

Next, Embodiment 5 of the present disclosure will be described with reference to FIG. 15. In a bus bar 80 according to the present embodiment, the metal forming a main body portion 81 is different from the metal forming a protruding piece 82. In FIG. 15, the main body portion 81 is highlighted to indicate that the main body portion 81 and the protruding piece 82 are made of different metals. The color of the main body portion 81 and the color of the protruding piece 82 may be the same or different.

Also, the core wire 30 of the electric wire 23 and the terminal 16 are made of the same type of metal. Accordingly, the core wire 30 and the wire connection portion 17 of the terminal 16 can be easily connected to each other through welding or the like. Also, even if the core 30 and the wire connection portion 17 are crimped, electric corrosion caused by contact between different metals can be prevented.

For example, the main body portion 81 may be constituted by copper or a copper alloy, and the protruding piece 82 may be made of aluminum or an aluminum alloy. In this case, the electrode terminal 13 of the power storage element 11 is made of copper or a copper alloy, and the core wire 30 of the electric wire 23 is made of aluminum or an aluminum alloy.

Conversely, the main body portion 81 may be constituted by aluminum or an aluminum alloy, and the protruding piece 82 may be made of copper or a copper alloy. In this case, the electrode terminal 13 of the power storage element 11 is made of aluminum or an aluminum alloy, and the core wire 30 of the electric wire 23 is made of copper or a copper alloy.

Accordingly, the main body portion 81 of the bus bar 80 and the electrode terminal 13 can be easily welded to each other, and the protruding piece 82 of the bus bar 80 and the bus bar connection portion 18 of the terminal 16 can be easily welded to each other. Also, the wire connection portion 17 and the core wire 30 are made of the same type of metal, and thus the wire connection portion 17 and the core wire 30 can be easily connected to each other.

Configurations other than those described above are similar to those of Embodiment 1, and thus similar members are given the same reference sign and redundant description will be omitted.

Embodiment 6

Figure 16:
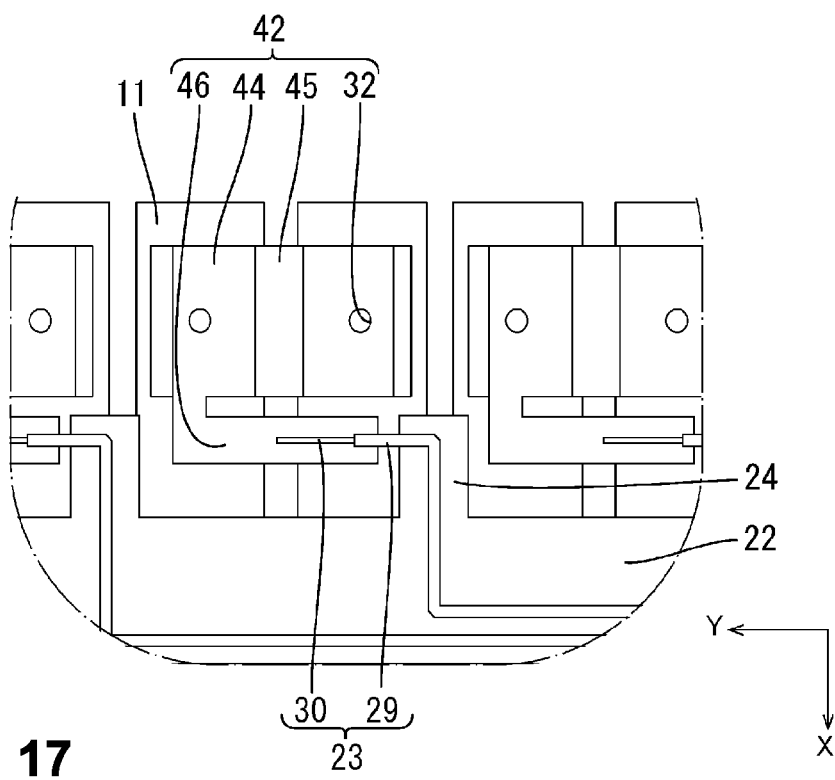
FIG. 16 is a partial enlarged plan view showing a power storage module according to Embodiment 6.

Next, Embodiment 6 of the present disclosure will be described with reference to FIG. 16. In the present embodiment, the core wire 30 of the electric wire 23 is connected to the protruding piece 46 of the bus bar 42. The core wire 30 and the protruding piece 46 are connected to each other by using a known method such as brazing or soldering, or welding such as laser welding, ultrasonic welding, and resistance welding.

Configurations other than those described above are similar to those of Embodiment 1, and thus similar members are given the same reference sign and redundant description will be omitted.

With the present embodiment, the need for the terminal is eliminated, and thus the number of components of the wiring module can be reduced.

Embodiment 7

Figure 17:
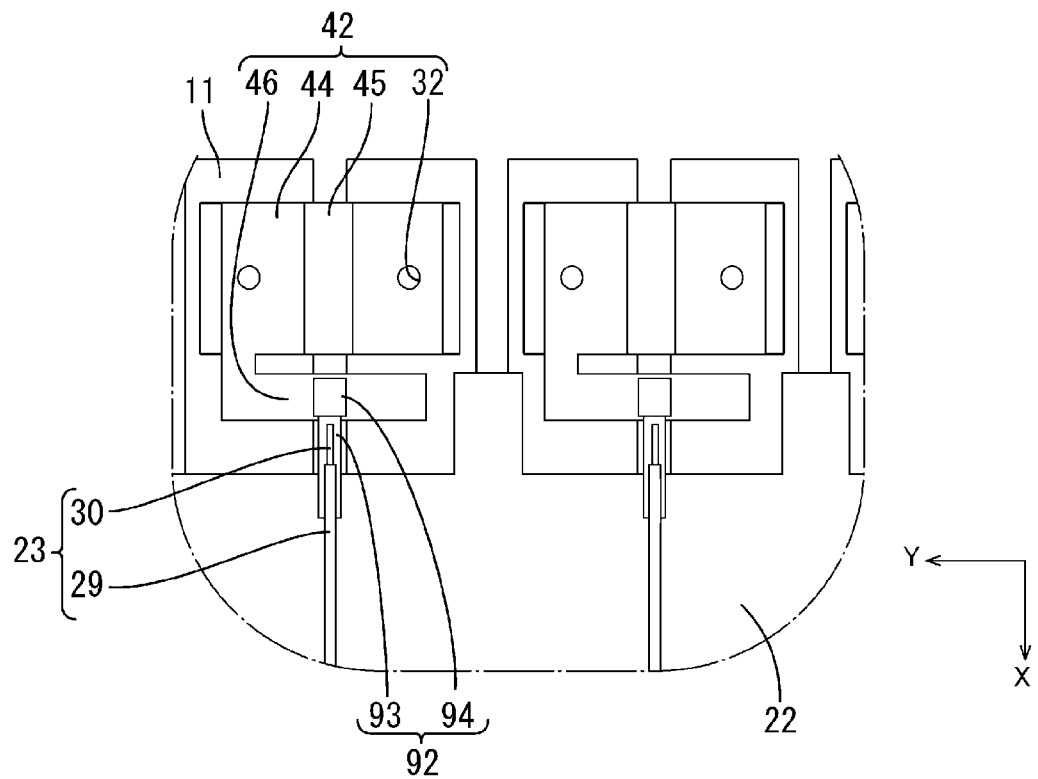
FIG. 17 is a partial enlarged plan view showing a power storage module according to Embodiment 7.

Next, Embodiment 7 of the present disclosure will be described with reference to FIG. 17. In the present embodiment, the protruding piece 46 of the bus bar 42 and a terminal 92 are connected to each other in an orthogonal state.

A bus bar connection portion 94 of the terminal 92 is placed on the upper surface of the protruding piece 46 of the bus bar 42. A configuration is employed where the branch line portion 34 extends in the left-right direction, and thus a wire connection portion 93 extends along the branch line portion 34. Accordingly, the terminal 92 is disposed in an orientation where it is overall orthogonal to the protruding piece 46 of the bus bar 42.

Configurations other than those described above are similar to those of Embodiment 1, and thus similar members are given the same reference sign and redundant description will be omitted.

The angle formed by the direction in which the protruding piece 46 extends and the direction in which the terminal 92 extends is not limited to a right angle, and can be set to an appropriate angle. Accordingly, the degree of freedom of the connection structure between the bus bar 42 and the terminal 92 can be increased.

Other Embodiments (1) The power storage elements 11 may be secondary cells or capacitors.

(2) In the sheet, the base material and the welding layer may be welded together, or the base material and the welding layer may be adhered to each other via an adhering layer.

(3) The terminal 72 in Embodiment 4 was described as having an L shape as seen from above, but the shape is not limited to this, and the terminal 72 may have a T shape as seen from above where the wire connection portion 73 extends in the left-right direction (intersecting direction) from the central region in the front-rear direction of the bus bar connection portion 74 extending in the front-rear direction (arrangement direction).

(4) The electric wires 23 according to the present embodiment were described as being coated wires, but there is no limitation to this, and the electric wires 23 may be enamel wires or bare wires.

LIST OF REFERENCE NUMERALS

1 Vehicle
2 Power storage pack
3 PCU
4 Wire harness
10, 50, 60, 70 Power storage module
11 Power storage element
12 Power storage element group
13 Electrode terminal
16, 72, 92 Terminal
17, 73, 93 Wire connection portion
18, 74, 94 Bus bar connection portion
20, 51, 61, 71 Wiring module
22, 52, 62 Sheet
23 Electric Wire
24 Extension piece
27 Base material
28 Welding layer
29 Insulating coating
30 Core wire
31 Positioning pin
32 Positioning hole
33 Trunk line portion
34 Branch line portion
42, 80 Bus bar
44, 81 Main body portion
45 Deforming portion
46, 82 Protruding piece
53 Right branch line portion
54 Left branch line portion
63 Pin (an example of a fixing portion)

The invention claimed is:

1. A wiring module to be attached to a plurality of power storage elements that each include an electrode terminal and are arranged side by side in an arrangement direction, the wiring module comprising:
an insulative sheet; and
a plurality of electric wires disposed along the arrangement direction, on a surface of the sheet,
wherein the electric wires are configured to be respectively electrically connected to bus bars that are connected to the electrode terminals of the plurality of power storage elements,
each of the electric wires includes a trunk line portion extending along the arrangement direction, and a branch line portion bent from the trunk line portion and extending in an intersecting direction that intersects with the arrangement direction,
end portions of the branch line portions are electrically connected to the bus bars,
the sheet includes a base material and a welding layer, and the plurality of electric wires are fixed to the welding layer,
the wiring module further includes a plurality of terminals, and
each of the plurality of terminals is a plate including a wire connection portion connected to one of the plurality of electric wires and a bus bar connection portion connected to one of the plurality of bus bars, so as to be provided between the one of the plurality of electric wires and the one of the bus bars.

2. The wiring module according to claim 1, wherein the bus bar connection portion extends in the arrangement direction.

3. The wiring module according to claim 2, wherein the wire connection portion extends in the intersecting direction.

4. The wiring module according to claim 1, wherein the wiring module is a vehicle wiring module to be installed and used in a vehicle.

5. The wiring module according to claim 1, wherein
the wire connection portion is elongated in the arrangement direction and the bus bar connection portion extends in the arrangement direction from one end of the wire connection portion in the arrangement direction, and
a width of the wire connection portion in a width direction is smaller than a width of the bus bar connection portion in the width direction, the width direction being perpendicular to the arrangement direction.

6. The wiring module according to claim 1, wherein
each of the plurality of terminals has an L-shape including the wire connection portion elongated in a width direction perpendicular to the arrangement direction, and the bus bar connection portion extending in the arrangement direction from an end of the wire connection portion in the width direction.

7. The wiring module according to claim 1, wherein
each of the plurality of electric wires includes a core wire and an insulating coating that surrounds the core wire, and
the welding layer of the sheet and the insulating coating of the electric wires are made of the same synthetic resin.

8. The wiring module according to claim 1, wherein
the sheet includes:
a rectangular portion having a rectangular shape elongated in the arrangement direction, and
a plurality of extension pieces provided to be spaced from each other in the arrangement direction, each of the plurality of extension pieces extending in a width direction from a longer edge of the rectangular portion extending in the arrangement direction, the width direction being perpendicular to the arrangement direction.

9. The wiring module according to claim 8, wherein
the branch line of each of the plurality of electric wires extends onto one extension piece of the plurality of extension pieces and is bent on the one extension piece to extend in the arrangement direction and to project from the one extension piece, and
the branch line projected from the one extension piece is connected to the wire connection portion of one of the plurality of terminals.

10. The wiring module according to claim 1, wherein
the welding layer is layered onto and covers an entire upper surface of the base material, and the plurality of electric wires are welded to the welding layer.

11. A power storage module comprising:
the wiring module according to claim 1;
the plurality of power storage elements that each include the electrode terminal and are arranged along the arrangement direction; and
the plurality of bus bars connected to the electrode terminals,
wherein the plurality of bus bars each include a main body portion connected to the electrode terminals, and a protruding piece that protrudes from the main body portion and extends in the arrangement direction, and
the protruding pieces and the electric wires are electrically connected to each other.

12. The power storage module according to claim 11, wherein
the protruding pieces of the bus bars and the bus bar connection portions of the terminals are connected to each other.

13. The power storage module according to claim 11,
wherein the bus bars are made of the same type of metal as the main body portions, and metal forming the protruding pieces and metal included in the electric wires are the same type of metal.

14. The power storage module according to claim 11,
wherein the sheet is fixed to the power storage elements via a fixing portion.

15. A wiring module to be attached to a plurality of power storage elements that each include an electrode terminal and are arranged side by side in an arrangement direction, the wiring module comprising:
an insulative sheet; and
a plurality of electric wires disposed along the arrangement direction, on a surface of the sheet,
wherein the electric wires are configured to be respectively electrically connected to bus bars that are connected to the electrode terminals of the plurality of power storage elements,
each of the electric wires includes a trunk line portion extending along the arrangement direction, and a branch line portion bent from the trunk line portion and extending in an intersecting direction that intersects with the arrangement direction,
end portions of the branch line portions are electrically connected to the bus bars, and
the sheet includes a base material and a welding layer layered onto and covering an entire upper surface of the base material, and the plurality of electric wires are welded to the welding layer.

* * * * *